US008374985B1

(12) United States Patent
Das et al.

(10) Patent No.: US 8,374,985 B1
(45) Date of Patent: *Feb. 12, 2013

(54) PRESENTING A DIVERSITY OF RECOMMENDATIONS

(75) Inventors: Abhinandan S. Das, Sunnyvale, CA (US); Ashutosh Garg, Sunnyvale, CA (US); Mayur Datar, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,987

(22) Filed: Nov. 21, 2011

Related U.S. Application Data (63) Continuation of application No. 12/033,540, filed on Feb. 19, 2008, now Pat. No. 8,065,254.

(60) Provisional application No. 60/890,606, filed on Feb. 19, 2007.

(51) Int. Cl.
*G06F 17/00* (2006.01)
*G06N 5/02* (2006.01)

(52) U.S. Cl. ........................................................ 706/46

(58) Field of Classification Search .................. 706/12, 706/46
See application file for complete search history.

(56) References Cited

U.S. PATENT DOCUMENTS

| | | | |
|---|---|---|---|
| 6,006,218 A | 12/1999 | Breese et al. | |
| 6,078,740 A | 6/2000 | DeTreville | |
| 6,519,591 B1 | 2/2003 | Cereghini et al. | |
| 6,556,960 B1 | 4/2003 | Bishop et al. | |
| 6,687,696 B2 | 2/2004 | Hofmann et al. | |
| 6,728,695 B1 | 4/2004 | Pathria et al. | |
| 6,981,040 B1 | 12/2005 | Konig et al. | |
| 7,113,185 B2 | 9/2006 | Jojic et al. | |
| 7,328,216 B2 | 2/2008 | Hofmann et al. | |
| 7,389,201 B2 | 6/2008 | Chickering et al. | |
| 7,685,276 B2 | 3/2010 | Konig et al. | |
| 2004/0034652 A1 | 2/2004 | Hofmann et al. | |
| 2004/0172267 A1 | 9/2004 | Patel et al. | |
| 2007/0038659 A1 | 2/2007 | Datar et al. | |

OTHER PUBLICATIONS

Cristianiti, N., and Shawe-Taylor, J. 'An Introduction to Support Vector Machines and Other Kernel-based Learning Methods.' Cambridge University Press, 1st edition (Mar. 28, 2000).*

Adomavicius, G., and Tuzhilin, A. 'Toward the Next Generation of Recommender Systems: A survey of the State-of-the-Art and Possible Extensions.' IEEE Transactions on Knowledge and Data Engineering, vol. 17, N. 6, Jun. 2005.

Blei, D.; Ng, A.; and Jordan, M. 'Latent Dirichlet Allocation.' In Journal of Machine Learning Research, 2003.

Breese, J.; Heckermann, D.; and Kadie, C. 'Empirical Analysis of Predictive Algorithms for Collaborative Filtering.' Proc. of the 14th Conf. on Uncertainty in Artificial Intelligence, Jul. 1998.

(Continued)

*Primary Examiner* — David R Vincent
*Assistant Examiner* — Benjamin Buss
(74) *Attorney, Agent, or Firm* — Fish & Richardson P.C.

(57) ABSTRACT

Methods, systems and apparatus, including computer program products, for providing a diversity of recommendations. According to one method, results are identified so as to increase the likelihood that at least one result will be of interest to a user. Following the identification of a first result, second and later results are identified based on an assumption that the previously identified results are not of interest to the user. The identification of diverse results can be based on formulas that approximate the probability or provide a likelihood score of a user selecting a given result, where a measured similarity between a given object and previously identified results tends to decrease the calculated probability approximation or likelihood score for that object.

36 Claims, 6 Drawing Sheets

OTHER PUBLICATIONS

Broder, A. 'On the resemblance and containment of documents.' Compression and Complexity of Sequences (SEQUENCES '97), 1998, pp. 21-29.

Buhler, J. 'Efficient large-scale sequence comparison by locality-sensitive hashing.' Bioinformatics, vol. 17, pp. 419-428, 2001.

Charikar, M. Similarity Estimation Techniques from Rounding Algorithms. Proc. of the 34$^{th}$ Annual ACM Symposium on Theory of Computing, STOC (2002).

Chang, et al., 'Bigtable: A Distributed Storage System for Structured Data,' 2006, Usenix Association, 14 pages.

Cohen, E. 'Size-Estimation Framework with Applications to Transitive Closure and Reachability.' Journal of Computer and System Sciences 55 (1997): 441-453.

Cohen, et al. 'Finding Interesting Associations without Support Pruning.' Proc. of the 16$^{th}$ Intl. Conf. on Data Engineering, (ICDE 2000).

Cristianiti, N., and Shawe-Taylor, J. 'An Introduction to Support Vector Machines and Other Kernel-based Learning Methods.' Cambridge University Press, 1$^{st}$ edition (Mar. 28, 2000).

Das et al., 'Google News Personalization: Scalable Online Collaborative Filtering,' WWW2007, May 8-12, 2007, Banff, Canada, 10 pages.

Datar, et al. 'Locality-Sensitive Hashing Scheme Based on P-Stable Distributions.' Proc. of the 20$^{th}$ ACM Annual Symposium on Computational Geometry (SOCG 2004).

Dean, et al., 'MapReduce: Simplified Data Processing on Large Clusters,' 2004, OSDI, 13 pages.

Gionis, A., et al. 'Similarity Search in High Dimensions via Hashing.' Proc. of the 25$^{th}$ Intl. Conf. on Very Large Data Bases, VLDB (1999).

Hofmann, 'Latent Semantic Models for Collaborative Filtering,' Jan. 2004, ACM, 27 pages.

Heckerman, et al., Dependency Networks for Inference, Collaborative Filtering, and Data Visualization., Journal of Machine Learning Research., Oct. 2000, pp. 49-75.

Indyk, P. 'A Small Approximately Min-Wise Independent Family of Hash Functions.' Proc. 10$^{th}$ Symposium on Discrete Algorithms, SODA (1999).

Indyk, P, and Motwani, R. Approximate Nearest Neighbor: Towards Removing the Curse of Dimensionality. Proc of the 30$^{th}$ Annual ACM Symposium on Theory on Computing, 1998, pp. 604-613.

Marlin, B., and Zemel, R. 'The Multiple Multiplicative Factor Model for Collaborative Filtering.' ACM Intl. Conf. Proceeding Series, vol. 69, 2004.

Motwani, R. and Raghavan, P. Randomized Algorithms. Cambridge University Press, 1985.

Resnick, et al. 'GroupLens: an Open architecture for Collaborative Filtering of Netnews.' Proc. of Computer Supported Cooperative Work Conf., 1994.

Sarwar, et al. 'Application of Dimensionality Reduction in Recommender Systems—A Case Study.' Proc. of the ACM WebKDD Workshop, 2000.

Sarwar, et al. 'Item-Based Collaborative Filtering Recommendation Algorithms.' Proc. of the 10$^{th}$ Intl. WWW Conf. , (WWW) 2001.

Shani, et al. 'An MDP-Based Recommender System.' Proc. of the 18$^{th}$ Conf. Uncertainty in Artificial Intelligence, Aug. 2002.

Yu, et al. 'Instance Selection Techniques for Memory-Based Collaborative Filtering.' Proc. of the Second Siam Intl. Conf. on Data Mining, (SDM) 2002.

* cited by examiner

PRESENTING A DIVERSITY OF RECOMMENDATIONS

RELATED APPLICATION

This is a continuation application which claims the priority under 35 U.S.C. §120 to U.S. application Ser. No. 12/033,540, filed Feb. 19, 2008, which claims the benefit under 35 U.S.C. §119(e) of U.S. Patent Application No. 60/890,606, filed Feb. 19, 2007, all of which are incorporated by reference herein in their entireties.

BACKGROUND

This specification relates to identifying particular data objects for recommendation.

The interconnection of the world's computers, made possible by the Internet, makes the information in millions of data stores available at the user interface of a connected device. Along with this abundance of data comes the associated problem of locating information of interest. In order to present contextually pertinent information, computer systems often provide a list of recommended data objects or content items, for example, results identified from among some quantity of candidate data objects. The identification can use any number of identification algorithms and criteria. Search engines provide a solution to this information finding problem in cases where a user knows, at least in some respects, what she is seeking. A query that includes one or more keywords related to the information being sought is entered, and the system returns a set of results, identifying data objects from which the user can choose. Other systems can provide recommendations based on a given context. A context can be, for example, a state of a collection of user data that evidences user interests through records of past activity. For example, a news web site can recommend news articles based on user interests evidenced by past Internet browsing activity, or as another example, a shopping web site can recommend products to a user based on product pages that a user has previously chosen to view.

Often, the set of data from which a given system identifies results includes two or more highly similar data objects. That is, the result set includes multiple results that are so similar that their inclusion in the result set might be considered by a user to be redundant. This often follows from the identification methods used to select results. If a first data object identified from a set of a candidate data scores highly according to the identification method used, then a similar data object is likely to score highly as well, leading to both being included in the set of results. In some cases, where a data set has many similar data objects, similar result listings might make up a majority, or an entire set of results.

In some situations, such as, for example, a search for a certain location of a retail chain, repetitive similar listings can be desirable. In other cases, however, such repetition obscures more dissimilar results that might be of interest to the user; or where the number of results is limited, the repetitive results may push any dissimilar results out of the result set completely.

SUMMARY

This specification describes technologies relating to identifying a diversity of recommendation results.

In general, one aspect of the subject matter described in this specification can be embodied in methods that include the actions of identifying K results from among a set of data objects, K being an integer greater than 1, each of the data objects in the set of data objects having a marginal interest-likelihood score, where identifying K results comprises identifying, from among the objects in the set of objects, a first result and first remaining data objects, the first remaining data objects being the set of data objects excluding the first result; then identifying from among the first remaining data objects a second result having a maximum conditional interest-likelihood score given that the first result is not selected; and presenting the K results.

One aspect of the subject matter described in this specification can be embodied in methods that include the actions of determining K results from among a set of data objects that give the expression $$I_{TOTAL} = I(\text{select } R_1) + I(\text{select } R_2 \text{ given no selection of } R_1) + \ldots + I(\text{select } R_K \text{ given no selection of any of } R_1 \ldots R_{K-1})$$

a maximum value, where each $R_i$ is a distinct result in the set of data objects, $I(\text{select } R_1)$ is a calculated interest-likelihood score representing a likelihood that a user will select $R_1$ from a list of presented results, $I(\text{select } R_2 \text{ given no selection of } R_1)$ is a calculated interest-likelihood score representing a likelihood that the user will select $R_2$ given that the user does not select $R_1$, and $I(\text{select } R_K \text{ given no selection of any of } R_1 \ldots R_{K-1})$ is a calculated interest-likelihood score representing a likelihood that the user will select $R_K$ given that the user has not selected any of $R_1$ through $R_{K-1}$; and presenting the K results.

Particular embodiments of the subject matter described in this specification can be implemented to realize one or more of the following advantages. The invention can provide a diverse result set which increases the likelihood that at least one of the results in the set will be of interest to a user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
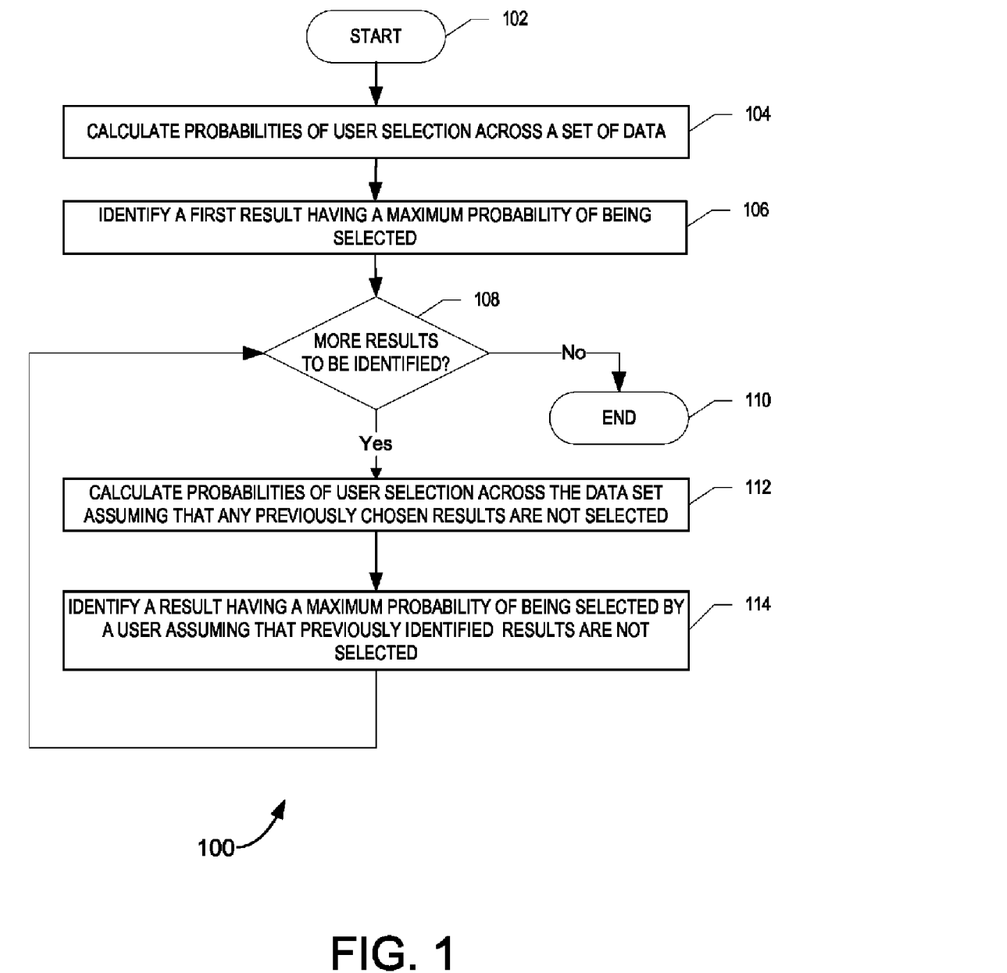
FIG. 1 is a flow chart of an exemplary process for providing a diverse result set.

FIG. 1 is a flow chart of an exemplary process for providing a diverse result set. The process operates in reference to a set of data. The data set is made up of a number of data objects.

The data objects in a data set can be of one or more types. For example, data objects can be files, database records, web pages, text documents, multimedia documents, or any other separately-addressable computer-storable form of information.

The data objects in the data set can be associated with probabilities indicating a likelihood that the data objects would be of interest to a user. In the methods described below, user selections (e.g., user clicks in user interfaces at user interface devices) are used as indications of user interest in a data object. User selection information for a user or a group of users can be collected and analyzed to determine user interest. The described methods, however, are applicable to other indications of user interest, collected survey results, for example. Where user selections are used as indications of interest, selection modes can include user input such as clicks and key presses, touch screen inputs, voice commands, tracked eye movements, and the like.

The data objects in the data set can each have an interest-likelihood score indicating a likelihood that the data objects would be selected by a user if the user is presented with the opportunity to do so. An interest-likelihood score is a score that is indicative of the likelihood of a user acting on an interest in a corresponding data object, e.g., a user selecting the corresponding data object. In some implementations, the interest-likelihood score is an empirically determined probability of user interest in a corresponding data object. Each data object can have an interest-likelihood score that, for example, indicates the probability that a user will select a given data object if a result representative of that data object is presented to the user. For example, the interest-likelihood score can represent the likelihood that a user will click on a result listing that references the given data object if the result listing is presented to the user in a list. For example, where the result listing shows a URL pointing to a data object that is the web page, a user click could cause a web page to be displayed.

Interest-likelihood scores, sometimes in the form of probabilities, are conventionally calculated by Internet recommendation engines, such as, for example, search engines, and insofar as it affects the process, any convenient form of calculation can be used. In some implementations, for example, the interest-likelihood scores can depend on the information the recommendation engine has about the user. In other implementations, the interest-likelihood scores can be user independent. Generally, the scores are calculated with reference to a given context. For example, an Internet search engine is a type of a recommendation engine where the context includes a search request, and results are identified from the data objects based on a calculated probability that a given data object satisfies the search request. Interest-likelihood scores of this kind are also calculated by other types of recommendation engines in generating a list of recommended data objects based on known information. For example, a recommendation engine can generate a list of recommended news articles for a user based on known user interests. The methods described below can be used with all types of recommendation engines, including, for example, search engines.

The description that follows presents examples using probabilities as the interest-likelihood scores. However, the calculations can be performed using more general interest-likelihood scores that, for example, need not be numbers between 0 and 1.

A system implementing the process 100 calculates the probabilities of user selection across a set of data (104). The process identifies a first result having a maximum probability of being selected (106). If no additional results are to be identified (108), then the process ends (110). If additional results are required or requested, then a conditional probability is calculated (112). A result having a highest probability of being selected according to this calculation is identified (114). The process continues to calculate conditional probabilities if additional results are to be identified (108), and ends when no more additional results are to be identified (110).

At each iteration, the conditional probability that is calculated is a conditional probability that a result will be selected, e.g., clicked by a user as a search result, given that none of the previously-identified results has been selected, e.g., clicked by the user as a search result. In some implementations, a surrogate for this conditional probability is calculated, as will be described below.

The process can be used to provide diversity in a result set presented to a user. A list of results identified in this manner tends to maximize the likelihood that at least one of the results will be of interest to a user, and, for example, be selected by a user to whom they are presented.

Conventionally, a set of results is identified in a manner that maximizes a total probability of selection where each result is identified without regard to other identified results. That is, conventional identification methods generally attempt to identify results to maximize a total probability by selecting a set of K results $R_i$ that maximize $P_{TOTAL}$ according to the following equation:

$$P_{TOTAL} = P(\text{select } R_1) + P(\text{select } R_2) + \ldots + P(\text{select } R_K)$$

where "$P(\text{select } R_i)$" is the marginal probability of $R_i$ being selected, i.e., the probability of $R_i$ being selected regardless of any other selection event.

Where the data set includes many similar or otherwise related data objects, however, this identification method can lead to a set of results that is repetitive and perhaps redundant. Also, where the probability calculation used does not accurately predict a user's interest, this method risks returning a result set having no results which are of interest to the user and therefore none are selected.

In contrast, the process of FIG. 1 tends to identify a diverse set of results. This process can be thought of as an attempt to maximize $P_{TOTAL}$, expressed as follows:

$$P_{TOTAL} = P(\text{select } R_1) + P(\text{select } R_2 \text{ given no selection of } R_1) + \ldots + P(\text{select } R_K \text{ given no selection of any of } R_1 \ldots R_{K-1})$$

The expression immediately above corresponds to user selection used as an indication of user interest. That expression can be represented more generally as:

$$P_{TOTAL} = P(\text{interest in } R_1) + P(\text{interest in } R_2 \text{ given no interest in } R_1) + \ldots + P(\text{interest in } R_K \text{ given no interest in any of } R_1 \ldots R_{K-1})$$

and more generally as:

$$I_{TOTAL} = I(\text{interest in } R_1) + I(\text{interest in } R_2 \text{ given no interest in } R_1) + \ldots + I(\text{interest in } R_K \text{ given no interest in any of } R_1 \ldots R_{K-1})$$

where "I" is an interest-likelihood score. Interest-likelihood scores "I" can be used in place of probabilities "P" in the probability examples described in this specification.

Identifying results in this manner helps to ensure a set of diverse results.

The process of FIG. 1 can be implemented in a computer system which provides result listings. For example, the process can be used in returning search results to a user of an Internet search engine. The process can also be used in a recommendation system that makes recommendations based on, for example, past user activity.

Figure 2:
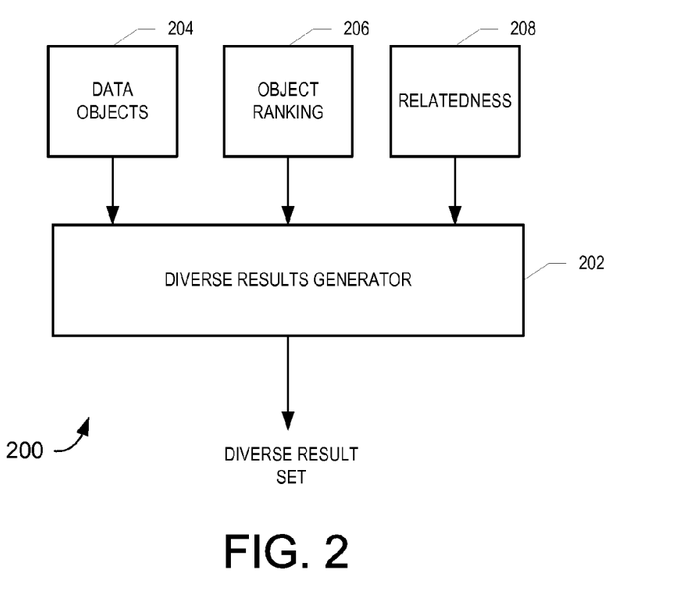
FIG. 2 is a block diagram of an exemplary system implementing a process for providing a diverse result set.

FIG. 2 is a block diagram of a system 200 implementing a process for providing a diverse result set. The diverse results generator 202 implements the process of FIG. 1 and receives input from the data objects element 204, the object ranking element 206, and the relatedness element 208. As described below, inputs from these elements can be used to calculate the probability that a user will select a given result. The data objects element 204 can be a database storing the data objects from which a result set will be identified. Alternatively, the data objects element 204 can be a database holding descriptions of the data objects, an index of data objects, and/or an index of data object descriptions. The object ranking element 206 can provide rankings of the data objects. The relatedness element 208 can provide relatedness scores that indicate a level of relatedness between one data object and one or more other data objects. The process of providing a diverse result set is not dependent on the specific ranking technique and relatedness scoring technique. Various techniques of ranking and scoring can be accommodated though the use of bias values. Relatedness may be defined in a domain dependent manner. For example, in the domain of web pages, considering a first web page W1, a second a web page W2 may be considered directly related to W1 if W1 links to W2, and W2 may be considered indirectly related to W1 if W2 links to a third web page W3 which in turn links to W1.

In the domain of a music search site, on the other hand, where results are data objects containing songs, an example definition of relatedness might be, considering a first song s1, s1 and a second song s2 are considered directly related if they are sung by the same singer in the same album, and indirectly related if sung by the same singer but in different albums.

Returning to the example of web pages, W1 can also be related to W2 if the two pages include, for example, similar content. Similarity is a more specific form of relatedness. In some implementations, the relatedness element 208 provides a content similarity score.

In some implementations, the diverse results generator 202, in operation, identifies K results where the probability that any result $R_K$ will be selected by a user is calculated according to the following formula:

$$P(R_K|\text{Not}(R_1 \ldots R_{K-1})) = \alpha e^{-\beta_0 - \beta_1 \delta(R_K) - \beta_2 Related(R_1 \ldots R_{K-1}, R_K)} \quad (1)$$

In this formula, $P(R_K | \text{Not} (R_1 \ldots R_{K-1}))$ is the conditional probability that a user will select $R_K$ given that the user did not select any of $R_1$ through $R_{K-1}$. $\alpha$ is a value learned from training the system; and $\beta_0$ is a (non-negative) learned bias value, as are $\beta_1$ and $\beta_2$. $\delta(R_K)$ is a measure of the inverse likelihood of a user selecting $R_K$ considered in isolation. That is:

$$\delta(R_K) = \frac{1}{\gamma(R_K)}$$

where $\gamma(R_K)$ is a measure of the likelihood of a user selecting $R_K$ considered in isolation (i.e., without regard to previously identified results). This, $\gamma(R_K)$, is $R_K$'s marginal selection probability. Related($R_1 \ldots R_{K-1}, R_K$) is a measure of the relatedness between $R_K$ and $R_1$ through $R_{K-1}$. It can be seen that, according to formula (1), above, as the relatedness between $R_K$ and $R_1$ though $R_{K-1}$ increases, the calculated conditional probability that a user will select the result $R_K$ decreases. The bias values $\beta_0$, $\beta_1$, and $\beta_2$ can be selected or learned in order to appropriately adjust the effect of the exponent terms on the calculation. The $\alpha$ and $\beta$ parameters can be learned by using any conventional machine learning technique, e.g., an expectation-maximization algorithm, regression algorithm, etc., to a log of user click data collected from user interactions with presentations of data objects including $R_1 \ldots R_K$.

For the first result, where no previous results have been identified, the above formula reduces to:

$$P(R_1) = \alpha e^{-\beta_0 - \beta_1 \delta(R_1)}$$

This represents the marginal selection probability that $R_1$ will be selected as weighted for use with the formula where K>1. It is not conditioned on any previously identified selection results since none have been identified prior to $R_1$ being identified. Values for later results ($R_2 \ldots$) can be penalized based one or more measures of relatedness (e.g., similarity and linking) between those results and previous results.

Figure 3:
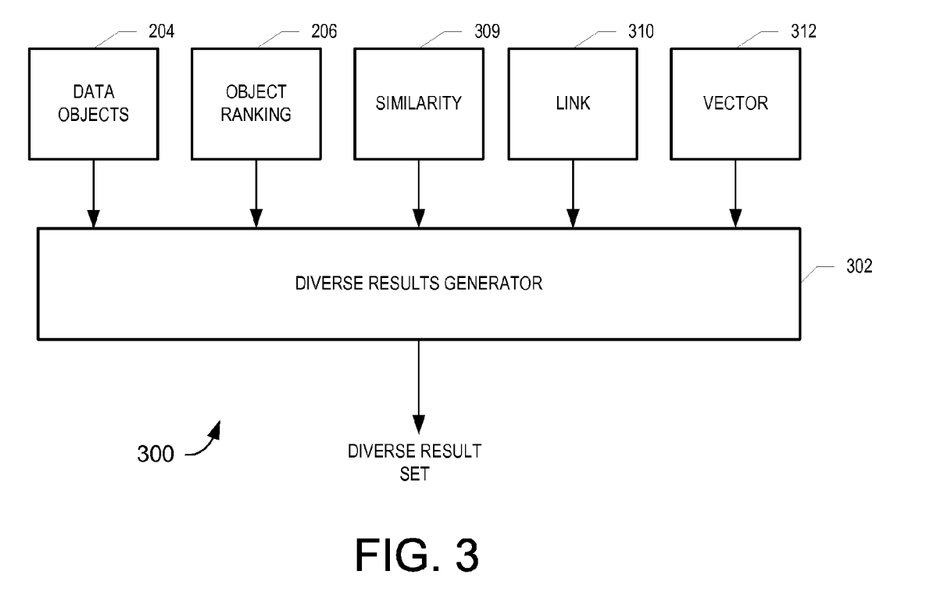
FIG. 3 is a block diagram of an alternative exemplary system implementing a process for providing a diverse result set.

FIG. 3 is a block diagram of another exemplary system 300 implementing a process for providing a diverse result set. In the system illustrated in FIG. 3, the data objects are documents available on the Internet, e.g., web pages. In this case, a similarity element 309, a link element 310, and a vector element 312 are included to adjust the probability calculation based on whether the web documents are similar, link to one another, and are linked through other web documents, respectively.

The diverse results generator 302 can identify K results according to the process of FIG. 1 where the probability that any result $R_K$ will be selected by a user can be calculated according to the following.

$$P(R_K|\text{Not}(R_1 \ldots R_{K-1})) = \alpha e^{-\beta_0 - \beta_1 \delta(R_K) - \beta_2 S(R_1 \ldots R_{K-1}, R_K) - \beta_3 Link(R_1 \ldots R_{K-1}, R_K) - \beta_4 Vector(R_1 \ldots R_{K-1}, R_K)}$$

Here the "S", "Link", and "Vector" exponents of e penalize a result for different forms of relatedness between $R_K$ and the results $R_1 \ldots R_{K-1}$. These exponents penalize a result that is similar to results $R_1 \ldots R_{K-1}$, links directly to any of the results $R_1 \ldots R_{K-1}$, is linked directly to by any of the results $R_1 \ldots R_{K-1}$, or is linked through other documents to any of the results $R_1 \ldots R_{K-1}$. The exponent "$-\beta_2 S(R_1 \ldots R_{K-1}, R_K)$" can be used to decrease the calculated probability of a user selecting $R_K$ where $\beta_2$ is a learned bias value and $S(R_1 \ldots R_{K-1}, R_K)$ is a measure of the similarity between $R_K$ and $R_1$ through $R_{K-1}$. The term "$-\beta_3 Link(R_1 \ldots R_{K-1}, R_K)$" can be used as an additional exponent to decrease the calculated probability of a user selecting $R_K$ where $\beta_3$ is a learned bias value and Link($R_1 \ldots R_{K-1}, R_K$) is a value based on whether or not $R_K$ directly links to or is directly linked to by any of $R_1 \ldots R_{K-1}$. The additional exponent "$-\beta_4 Vector(R_1 \ldots R_{K-1}, R_K)$" can be used to affect the probability calculation where $\beta_4$ is a learned bias value and Vector($R_1$-$R_{K-1}, R_K$) is a value based on whether or not $R_K$ and any of $R_1 \ldots R_{K-1}$ are linked (indirectly) to each other through other web pages. The value can depend on the number of pages (if any) between $R_K$ and any of $R_1$ though $R_{K-1}$. Though shown together in the above example, exponents for similarity, direct linking, and vectored linking can be used separately.

Analyzing each of the data objects to compute relatedness measurements based on content can be computationally expensive. In some implementations, similarity between results can be measured using records of past user activity. For example, a click history of a user and/or the click histories of many users can be used (e.g. a covisitation analysis of records of past user activity can be used to generate a similarity score). Such an approach is content agnostic, is less computationally intensive, and has the added advantage of users making similarity determinations, at least implicitly. Having users make similarity determinations is advantageous because it is the behavior of the users that the probability calculation is attempting to model.

Figure 4:
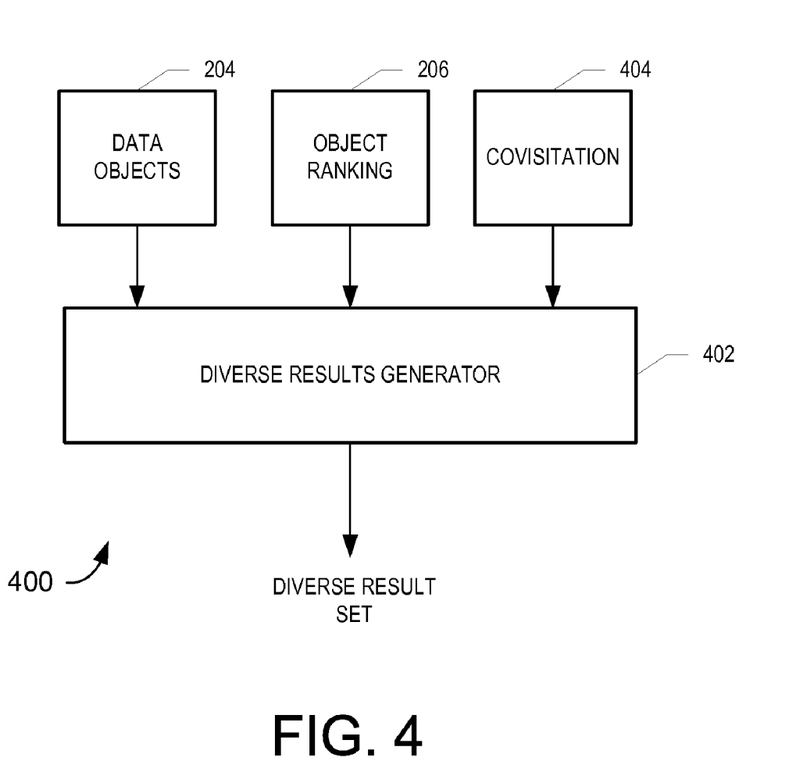
FIG. 4 is a block diagram of an exemplary system implementing a process for providing a diverse result set using a covisitation analysis.

FIG. 4 is a block diagram of an exemplary system implementing a process for providing a diverse result set using a covisitation measurement. The diverse results generator 402 can receive a covisitation score from covisitation element 404.

Covisitation measurements can be computed in a number of different ways using user click (selection) histories of, for example, user activity performed using an Internet browser. Covisitation can be said to occur, for example, where a click history indicates that a user has selected both $R_1$ and $R_2$ (covisitation measured within a user boundary). Covisitation can alternatively be defined as occurring where a click history indicates that a user selected both $R_i$ and $R_2$ during a certain period of time (covisitation measured within a user boundary and a time boundary). Covisitation can alternatively be defined as occurring where a click history indicates that a user selected both $R_1$ and $R_2$ during a single session (covisitation measured within a user boundary and a session boundary).

In the exemplary embodiment depicted in FIG. 4, input from the covisitation element 404 is used to determine a similarity score between $R_K$ and any previously identified results. For brevity, this score will be referred to as a covisitation score. The probability of a user selecting $R_K$ becomes:

$$P(R_K|\text{Not}(R_1 \ldots R_{K-1}))_{R^{K-1},RK)} = \alpha e^{-\beta_0 - \beta_1 \delta(R_K) - \beta_2 Cv(R_1 \ldots}$$

where Cv is the covisitation score between $R_K$ and any previously identified results.

In some implementations, the process for providing diverse results is used in an Internet news article recommendation system.

Figure 5:
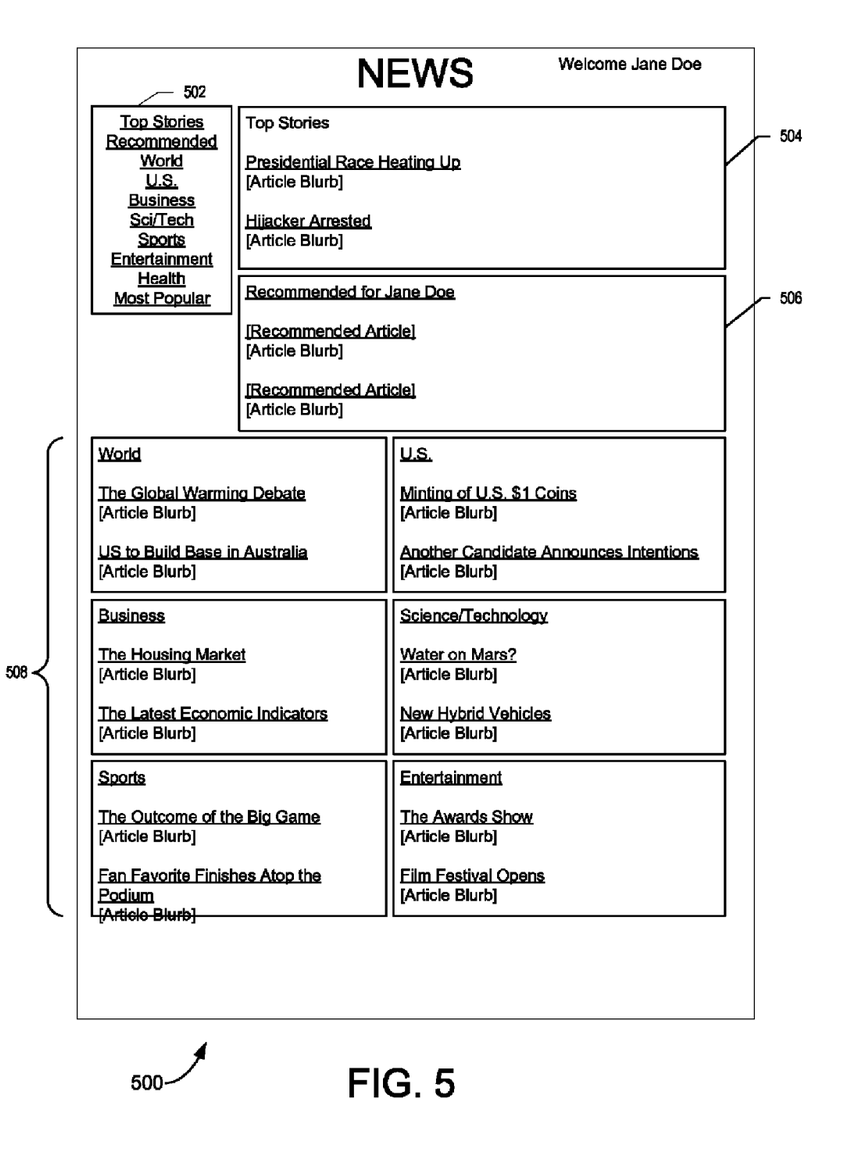
FIG. 5 illustrates an example Internet news site homepage having a recommended articles section.

FIG. 5 illustrates an example Internet news site homepage 500 having a recommended articles section. Links section 502 includes links to pages having additional articles in the listed groupings. The welcome message at the top of the homepage indicates that a user Jane Doe is logged into or otherwise known by the site (e.g., through the use of browser cookies and the like). The homepage also includes a top stories section 504 including titles and snippets for two news articles, a recommendation section 506 including titles and snippets for two news articles, and additional sections 508 which have titles and snippets for articles in various topic groupings.

The two articles represented by the titles and snippets in the recommendation section can be identified from a set of data objects, which in this example are a pool of candidate articles, by a process for identifying diverse results. There are two recommended articles shown, i.e., K=2 for the calculations described above. A user click on the "Recommended" link, either in the links section 502 or at the top of the recommendation section 506, can cause a browser to display another page that includes a longer list of recommended articles.

Figure 6:
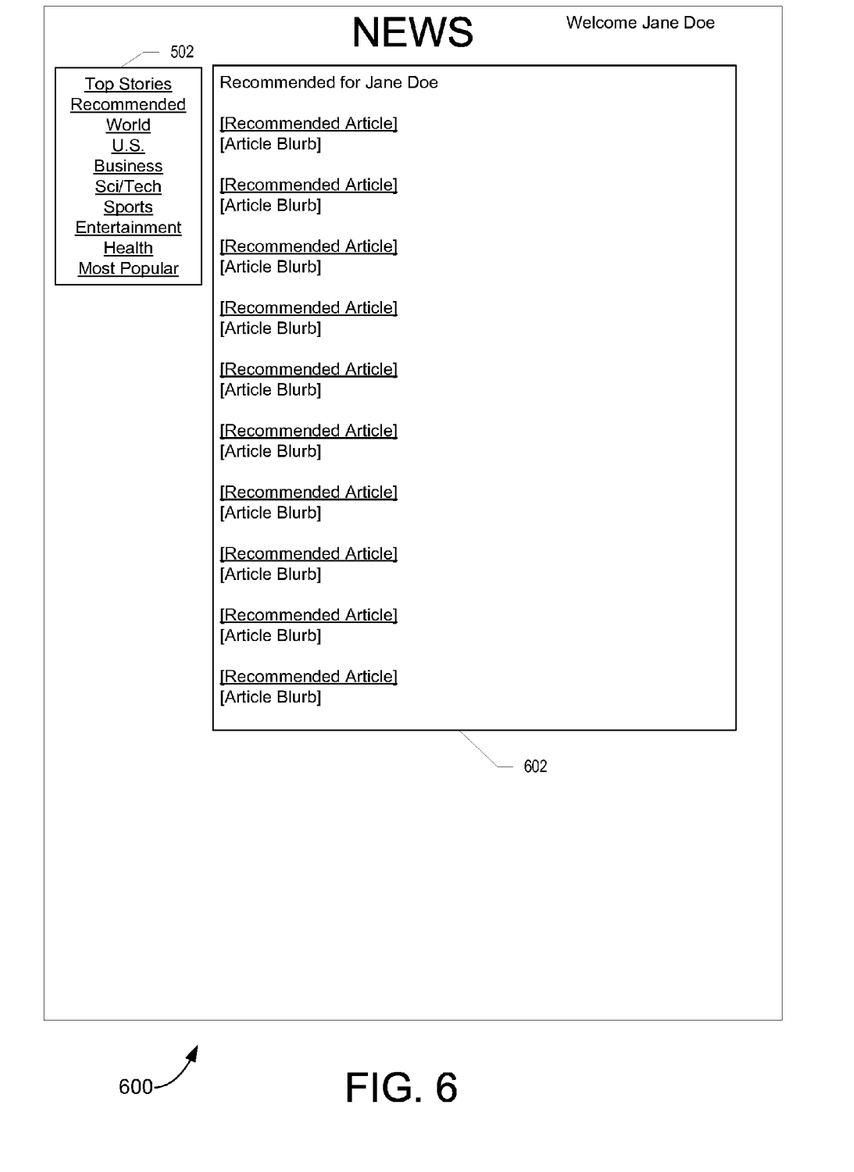
FIG. 6 illustrates an example Internet news page with a list of recommended articles.

Clicking on either of the "Recommended" links can, for example, cause the browser to display a page like the one illustrated in FIG. 6.

FIG. 6 illustrates an example Internet news page 600 with a list of recommended articles. The recommended section 602 includes a list of article titles and snippets. Ten articles are represented in section 602. The ten articles were identified from a pool of candidate articles by a process for identifying diverse results.

For a news recommendation system, the data set (the pool of candidate articles) is subject to frequent changes and updates. For an up to date news site, new articles are frequently added, and old articles may become stale and be dropped from the pool of candidates.

The news recommendation system can pick a set of K articles according to:

$$P(R_K|\text{Not}(R_1 \ldots R_{K-1}))_{R^{K-1},RK)} = \alpha e^{-\beta_0 - \beta_1 \delta(R_K) - \beta_2 Cv(R_1 \ldots}$$

Generally it is desirable to present results in an order of decreasing likelihood of user interest starting with the result most likely to be of interest to the user, but it is not a requirement that identified results be presented to a user in the order identified or in any particular order. For such a system, covisitation can be defined as the visitation of two articles by the same user within a defined period of time (covisitation measured within a user boundary and a time boundary).

Figure 7:
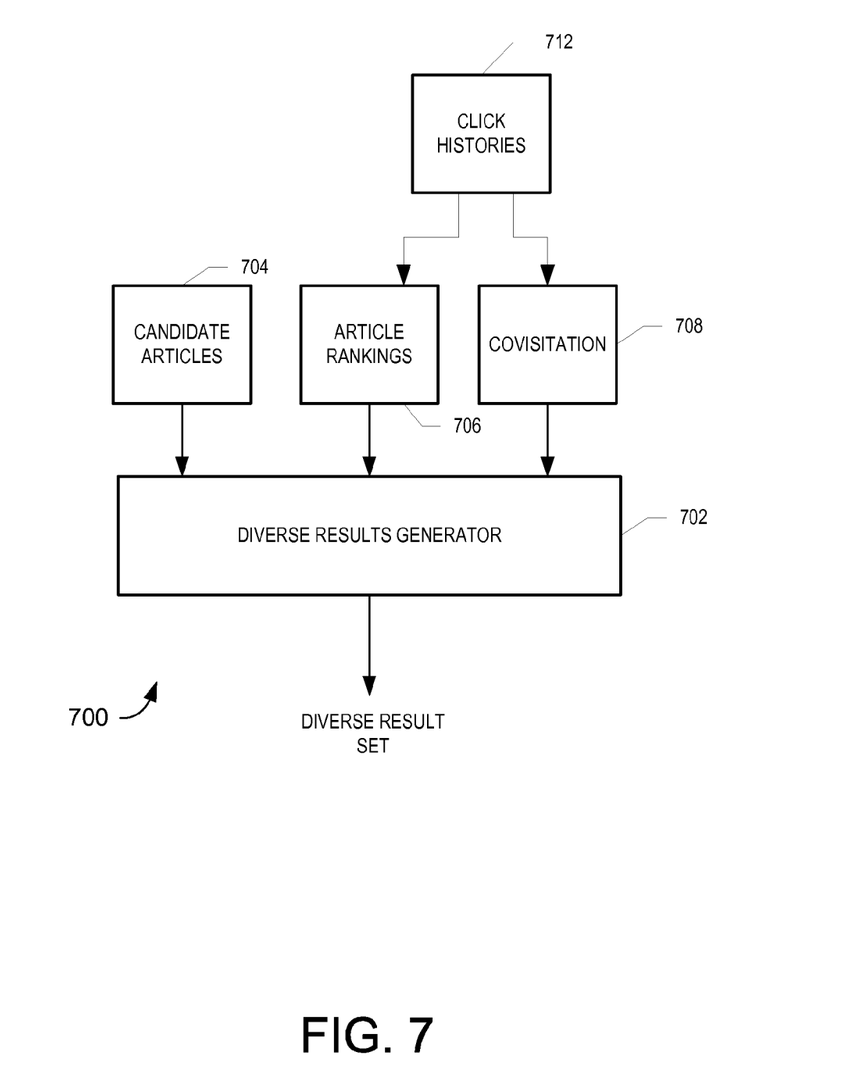
FIG. 7 is a block diagram of an exemplary news article recommendation system implementing a process for providing a diverse result set using a covisitation analysis.

FIG. 7 is a block diagram of an exemplary news article recommendation system implementing a process for providing a diverse result set using a covisitation analysis. The diverse results generator 702 receives input from the candidate articles element 704, the article rankings element 706, and the covisitation element 708. Click histories element 712 provides input to the article rankings element 706 and the covisitation element 708.

In some implementations, users can be clustered based on areas of interest for purposes of article ranking. For example, users interested in world politics can be clustered. Clicks on articles made by members of the cluster can then affect the ranking of those articles for other members in the cluster. User clustering can be performed according to known clustering techniques.

The article ranking element 706 provides the $\delta(R_K)$ term in the calculation. The current user is known (being logged in, or from a cookie, on the web site, and this information is passed to the diverse results generator 702 and/or the article ranking element 706).

The covisitation element 708 provides the Cv($R_1 \ldots R_{K-1}$, $R_K$) term in the probability calculation. The covisitation score of an article $R_K$ is based on the number of users (having a click history in the click histories element 712) that have clicked on both the article $R_K$ and any of the previously identified results $R_1$ through $R_{K-1}$ within a certain time interval. For example, covisitation can be said to occur between $R_1$ and $R_K$ where any user having click history information in the click histories element 712 clicks on $R_K$ and also clicks on $R_1$ within the next three hours. The number of instances of covisitation between articles can be tracked by the covisitation element and used to calculate the covisitation score. The effect of covisitation occurrences on the covisitation score can be discounted over time based on their age. In some implementations, the covisitation score of an article $R_K$ is based on a set of users (having click history in the click histories element 712) that have clicked on both the article $R_K$ and any of the previously identified results $R_1$ through $R_{K-1}$ within a certain time interval. For example, a count corresponding to a user in the set can be weighted according to a property of that user, e.g., that the user has shared common interests with the user for which recommendations are being made.

In operation, a first result article is identified from the candidate articles by the diverse results generator 702. The diverse results generator 702 iterates over the candidate articles to determine the article having a maximum probability of being selected. Since no previous articles have been identified, the value of Cv in this case is zero and the term disappears from the probability calculation. In identifying a second result, the diverse results generator will iterate over the candidate articles to identify a second article having a maximum probability of being selected. In this case, however, probability calculations will be affected by whether or not the articles have been covisited with the first identified article. If covisitation exists, then the probability value for the candidate article is decreased. This can tend to cause the second identified result to be diverse from the first identified result. The diverse results generator 702 will continue to identify additional results based on the number of results requested (K). For the web page shown in FIG. 5, two articles are identified in this manner. For the web page shown in FIG. 6, ten articles are identified in this manner.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, computers can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method, the method comprising:
   identifying K results from among a set of data objects, K being an integer greater than 2 wherein identifying K results comprises:
   identifying from among the data objects in the set of objects a first result of the K results and first remaining data objects, the first result being one data object of the set of data objects and the first remaining data objects being the set of data objects excluding the first result; and then
   identifying from among the first remaining data objects a second result of the K results having a maximum conditional interest-likelihood score that a user will select the second result, wherein the score is based in part on a measure of similarity between the first result and the second result, and wherein the score decreases as the measure of similarity increases; and
   providing the K results as recommendations including the first result and the second result.

2. The method of claim 1 wherein the maximum conditional interest likelihood score that the user will select the second result assumes that the user does not select the first result.

3. The computer implemented method of claim 2, wherein K is greater than 3, and wherein identifying K results further comprises:
   identifying (K−1)st remaining data objects, the (K−1)st remaining data objects being the first remaining data objects excluding the second through the (K−1)st results; and
   identifying from among the (K−1)st remaining data objects a Kth result having a maximum conditional interest-likelihood score that the user will select the Kth result given that the first result through the (K−1)st results are not selected.

4. The method of claim 1 wherein the measure of similarity between the first result and the second result is based on a history of past user click behavior.

5. The method of claim 4 wherein the history of past user click behavior takes into account user selections of the first result and the second result when the first result is selected within a same time period as the second result.

6. The method of claim 4 wherein the history of past user click behavior takes into account user selections of the first result and the second result when the first result is selected within a same time session as the second result.

7. The computer implemented method of claim 1, wherein K is at least 3, and wherein identifying K results further comprises:
   identifying second remaining data objects, the second remaining data objects being the first remaining data objects excluding the second result; and
   identifying from among the second remaining data objects a third result having a maximum conditional interest-likelihood score that the user will select the third result given that the first result and the second result are not selected.

8. The computer implemented method of claim 1, wherein each conditional interest-likelihood score is calculated according to the formula $$I(R_K|\text{Not}(R_1 \ldots R_{K-1})) = \alpha e^{-\beta_0 - \beta_1 \delta(R_K) - \beta_2 S(R_1 \ldots R_{K-1}, R_K)}$$

where $\alpha$ is a value learned from training, $\beta_0$, $\beta_1$ and $\beta_2$ are learned bias values, $\delta(R_K)$ is a measure of the inverse likelihood of a user selecting $R_K$ considered in isolation, and $S(R_1 \ldots R_{K-1}, R_K)$ is a measure of the similarity between $R_K$ and $R_1$ through $R_{K-1}$.

9. The computer implemented method of claim 1, wherein each conditional interest-likelihood score is calculated according to the formula $$I(R_K|\text{Not}(R_1 \ldots R_{K-1})) = \alpha e^{-\beta_0 - \beta_1 \delta(R_K) - \beta_2 S(R_1 \ldots R_{K-1}, R_K) - \beta_3 \text{Link}(R_1 \ldots R_{K-1}, R_K)},$$

where $\alpha$ is a value learned from training, $\beta_0$, $\beta_1$, $\beta_2$, and $\beta_3$ are learned bias values, $\delta(R_K)$ is a measure of the inverse likelihood of a user selecting $R_K$ considered in isolation, $S(R_1 \ldots R_{K-1}, R_K)$ is a measure of the similarity between $R_K$ and $R_1$ through $R_{K-1}$, and $\text{Link}(R_1 \ldots R_{K-1}, R_K)$ is a value based on whether $R_K$ directly links to or is directly linked to by any of $R_1 \ldots R_{K-1}$.

10. The computer implemented method of claim 1, wherein each conditional interest-likelihood score is calculated according to the formula $$I(R_K|\text{Not}(R_1 \ldots R_{K-1})) = \alpha e^{-\beta_0 - \beta_1 \delta(R_K) - \beta_2 S(R_1 \ldots R_{K-1}, R_K) - \beta_3 \text{Link}(R_1 \ldots R_{K-1}, R_K) - \beta_4 \text{Vector}(R_1 \ldots R_{K-1}, R_K)},$$

where $\alpha$ is a value learned from training, $\beta_0$, $\beta_1$, $\beta_2$, $\beta_3$, and $\beta_4$ are learned bias values, $\delta(R_K)$ is a measure of the inverse likelihood of a user selecting $R_K$ considered in isolation, $S(R_1 \ldots R_{K-1}, R_K)$ is a measure of the similarity between $R_K$ and $R_1$ through $R_{K-1}$, $\text{Link}(R_1 \ldots R_{K-1}, R_K)$ is a value based on whether $R_K$ directly links to or is directly linked to by any of $R_1 \ldots R_{K-1}$, and $\text{Vector}(R_1 - R_{K-1}, R_K)$ is a value based on whether $R_K$ and any of $R_1 \ldots R_{K-1}$ are indirectly linked to each other.

11. The computer implemented method of claim 1, wherein the first result has a maximum marginal interest-likelihood score among the set of data objects.

12. The computer implemented method of claim 1, wherein the conditional interest-likelihood score is calculated as an empirically determined probability.

13. A system comprising:
   data processing apparatus programmed to perform operations comprising:
   identifying K results from among a set of data objects, K being an integer greater than 2 wherein identifying K results comprises:
   identifying from among the data objects in the set of objects a first result of the K results and first remaining data objects, the first result being one data object of the set of data objects and the first remaining data objects being the set of data objects excluding the first result; and then
   identifying from among the first remaining data objects a second result of the K results having a maximum conditional interest-likelihood score that a user will select the second result, wherein the score is based in part on a measure of similarity between the first result and the second result, and wherein the score decreases as the measure of similarity increases; and providing the K results as recommendations including the first result and the second result.

14. The system of claim 13 wherein the maximum conditional interest likelihood score that the user will select the second result assumes that the user does not select the first result.

15. The system of claim 14, wherein K is greater than 3, and wherein identifying K results further comprises:
   identifying (K−1)st remaining data objects, the (K−1)st remaining data objects being the first remaining data objects excluding the second through the (K−1)st results; and
   identifying from among the (K−1)st remaining data objects a Kth result having a maximum conditional interest-likelihood score that the user will select the Kth result given that the first result through the (K−1)st results are not selected.

16. The system of claim 13 wherein the measure of similarity between the first result and the second result is based on a history of past user click behavior.

17. The system of claim 16 wherein the history of past user click behavior takes into account user selections of the first result and the second result when the first result is selected within a same time period as the second result.

18. The system of claim 16 wherein the history of past user click behavior takes into account user selections of the first result and the second result when the first result is selected within a same time session as the second result.

19. The system of claim 13, wherein K is at least 3, and wherein identifying K results further comprises:
   identifying second remaining data objects, the second remaining data objects being the first remaining data objects excluding the second result; and
   identifying from among the second remaining data objects a third result having a maximum conditional interest-likelihood score that the user will select the third result given that the first result and the second result are not selected.

20. The system of claim 13, wherein each conditional interest-likelihood score is calculated according to the formula $$I(R_K|\text{Not}(R_1 \ldots R_{K-1}))=\alpha e^{-\beta_0-\beta_1\delta(R_K)-\beta_2 S(R_1 \ldots R_{K-1}, R_K)},$$

where $\alpha$ is a value learned from training, $\beta_0$, $\beta_1$ and $\beta_2$ are learned bias values, $\delta(R_K)$ is a measure of the inverse likelihood of a user selecting $R_K$ considered in isolation, and $S(R_1 \ldots R_{K-1}, R_K)$ is a measure of the similarity between $R_K$ and $R_1$ through $R_{K-1}$.

21. The system of claim 13, wherein each conditional interest-likelihood score is calculated according to the formula $$I(R_K|\text{Not}(R_1 \ldots R_{K-1}))=\alpha e^{-\beta_0-\beta_1\delta(R_K)-\beta_2 S(R_1 \ldots R_{K-1}, R_K)-\beta_3 Link(R_1 \ldots R_{K-1}, R_K)},$$

where $\alpha$ is a value learned from training, $\beta_0$, $\beta_1$, $\beta_2$, and $\beta_3$ are learned bias values, $\delta(R_K)$ is a measure of the inverse likelihood of a user selecting $R_K$ considered in isolation, $S(R_1 \ldots R_{K-1}, R_K)$ is a measure of the similarity between $R_K$ and $R_1$ through $R_{K-1}$, and $Link(R_1 \ldots R_{K-1}, R_K)$ is a value based on whether $R_K$ directly links to or is directly linked to by any of $R_1 \ldots R_{K-1}$.

22. The system of claim 13, wherein each conditional interest-likelihood score is calculated according to the formula $$I(R_K|\text{Not}(R_1 \ldots R_{K-1}))=\alpha e^{-\beta_0-\beta_1\delta(R_K)-\beta_2 S(R_1 \ldots R_{K-1}, R_K)-\beta_3 Link(R_1 \ldots R_{K-1}, R_K)-\beta_4 Vector(R_1 \ldots R_{K-1}, R_K)},$$

where $\alpha$ is a value learned from training, $\beta_0$, $\beta_1$, $\beta_2$, $\beta_3$, and $\beta_4$ are learned bias values, $\delta(R_K)$ is a measure of the inverse likelihood of a user selecting $R_K$ considered in isolation, $S(R_1 \ldots R_{K-1}, R_K)$ is a measure of the similarity between $R_K$ and $R_1$ through $R_{K-1}$, $Link(R_1 \ldots R_{K-1}, R_K)$ is a value based on whether $R_K$ directly links to or is directly linked to by any of $R_1 \ldots R_{K-1}$, and $Vector(R_1-R_{K-1}, R_K)$ is a value based on whether $R_K$ and any of $R_1 \ldots R_{K-1}$ are indirectly linked to each other.

23. The system of claim 13, wherein the first result has a maximum marginal interest-likelihood score among the set of data objects.

24. The system of claim 13, wherein the conditional interest-likelihood score is calculated as an empirically determined probability.

25. A non-transitory computer-readable storage medium having instructions stored thereon that, when executed by data processing apparatus, cause the data processing apparatus to perform operations comprising:
   identifying K results from among a set of data objects, K being an integer greater than 2 wherein identifying K results comprises:
   identifying from among the data objects in the set of objects a first result of the K results and first remaining data objects, the first result being one data object of the set of data objects and the first remaining data objects being the set of data objects excluding the first result; and then
   identifying from among the first remaining data objects a second result of the K results having a maximum conditional interest-likelihood score that a user will select the second result, wherein the score is based in part on a measure of similarity between the first result and the second result, and wherein the score decreases as the measure of similarity increases; and
   providing the K results as recommendations including the first result and the second result.

26. The non-transitory computer-readable storage medium of claim 25 wherein the maximum conditional interest likelihood score that the user will select the second result assumes that the user does not select the first result.

27. The non-transitory computer-readable storage medium of claim 26, wherein K is greater than 3, and wherein identifying K results further comprises:
   identifying (K−1)st remaining data objects, the (K−1)st remaining data objects being the first remaining data objects excluding the second through the (K−1)st results; and
   identifying from among the (K−1)st remaining data objects a Kth result having a maximum conditional interest-likelihood score that the user will select the Kth result given that the first result through the (K−1)st results are not selected.

28. The non-transitory computer-readable storage medium of claim 25 wherein the measure of similarity between the first result and the second result is based on a history of past user click behavior.

29. The non-transitory computer-readable storage medium of claim 28 wherein the history of past user click behavior takes into account user selections of the first result and the second result when the first result is selected within a same time period as the second result.

30. The non-transitory computer-readable storage medium of claim 28 wherein the history of past user click behavior takes into account user selections of the first result and the second result when the first result is selected within a same time session as the second result.

31. The non-transitory computer-readable storage medium of claim 25, wherein K is at least 3, and wherein identifying K results further comprises:
identifying second remaining data objects, the second remaining data objects being the first remaining data objects excluding the second result; and
identifying from among the second remaining data objects a third result having a maximum conditional interest-likelihood score that the user will select the third result given that the first result and the second result are not selected.

32. The non-transitory computer-readable storage medium of claim 25, wherein each conditional interest-likelihood score is calculated according to the formula $$I(R_K|\text{Not}(R_1 \ldots R_{K-1})) = \alpha e^{-\beta_0 - \beta_1 \delta(R_K) - \beta_2 S(R_1 \ldots R_{K-1}, R_K)},$$

where $\alpha$ is a value learned from training, $\beta_0$, $\beta_1$ and $\beta_2$ are learned bias values, $\delta(R_K)$ is a measure of the inverse likelihood of a user selecting $R_K$ considered in isolation, and $S(R_1 \ldots R_{K-1}, R_K)$ is a measure of the similarity between $R_K$ and $R_1$ through $R_{K-1}$.

33. The non-transitory computer-readable storage medium of claim 25, wherein each conditional interest-likelihood score is calculated according to the formula $$I(R_K|\text{Not}(R_1 \ldots R_{K-1})) = \alpha e^{-\beta_0 - \beta_1 \delta(R_K) - \beta_2 S(R_1 \ldots R_{K-1}, R_K) - \beta_3 \text{Link}(R_1 \ldots R_{K-1}, R_K)},$$

where $\alpha$ is a value learned from training, $\beta_0$, $\beta_1$, $\beta_2$, and $\beta_3$ are learned bias values, $\delta(R_K)$ is a measure of the inverse likelihood of a user selecting $R_K$ considered in isolation, $S(R_1 \ldots R_{K-1}, R_K)$ is a measure of the similarity between $R_K$ and $R_1$ through $R_{K-1}$, and $\text{Link}(R_1 \ldots R_{K-1}, R_K)$ is a value based on whether $R_K$ directly links to or is directly linked to by any of $R_1 \ldots R_{K-1}$.

34. The non-transitory computer-readable storage medium of claim 25, wherein each conditional interest-likelihood score is calculated according to the formula $$I(R_K|\text{Not}(R_1 \ldots R_{K-1})) = \alpha e^{-\beta_0 - \beta_1 \delta(R_K) - \beta_2 S(R_1 \ldots R_{K-1}, R_K) - \beta_3 \text{Link}(R_1 \ldots R_{K-1}, R_K) - \beta_4 \text{Vector}(R_1 \ldots R_{K-1}, R_K)},$$

where $\alpha$ is a value learned from training, $\beta_0$, $\beta_1$, $\beta_2$, $\beta_3$, and $\beta_4$ are learned bias values, $\delta(R_K)$ is a measure of the inverse likelihood of a user selecting $R_K$ considered in isolation, $S(R_1 \ldots R_{K-1}, R_K)$ is a measure of the similarity between $R_K$ and $R_1$ through $R_{K-1}$, $\text{Link}(R_1 \ldots R_{K-1}, R_K)$ is a value based on whether $R_K$ directly links to or is directly linked to by any of $R_1 \ldots R_{K-1}$, and $\text{Vector}(R_1 - R_{K-1}, R_K)$ is a value based on whether $R_K$ and any of $R_1 \ldots R_{K-1}$ are indirectly linked to each other.

35. The non-transitory computer-readable storage medium of claim 25, wherein the first result has a maximum marginal interest-likelihood score among the set of data objects.

36. The non-transitory computer-readable storage medium of claim 25, wherein the conditional interest-likelihood score is calculated as an empirically determined probability.

* * * * *

UNITED STATES PATENT AND TRADEMARK OFFICE
CERTIFICATE OF CORRECTION

PATENT NO.     : 8,374,985 B1
APPLICATION NO. : 13/300987
DATED          : February 12, 2013
INVENTOR(S)    : Abhinandan S. Das, Ashutosh Garg and Mayur Dhondu Datar Page 1 of 3

It is certified that error appears in the above-identified patent and that said Letters Patent is hereby corrected as shown below:

In the Claims:

Column 12, Line 10 at Claim 8; replace:
"$I(R_K|\text{NOT}(R_1 \ldots R_{K-1})) = \alpha e^{-\beta_0 - \beta_1 \delta(R_K) - \beta_2(R_1 \ldots R_{K-1}, R_K)}$" with -- $I(R_K|\text{NOT}(R_1 \ldots R_{K-1})) = \alpha e^{-\beta_0 - \beta_1 \delta(R_K) - \beta_2 S(R_1 \ldots R_{K-1}, R_K)}$, --

Column 12, Lines 19-20 at Claim 9; replace:
"$I(R_K|\text{NOT}(R_1 \ldots R_{K-1})) = \alpha e^{-\beta_0 - \beta_1 \delta(R_K) - \beta_2 S(R_1 \ldots R_1 \ldots R^{K-1}, R_K) - \beta_3 Link(R_1 \ldots R_{K-1}, R_K)}$,"

with

-- $I(R_K|\text{NOT}(R_1 \ldots R_{K-1})) = \alpha e^{-\beta_0 - \beta_1 \delta(R_K) - \beta_2 S(R_1 \ldots R_{K-1}, R_K) - \beta_3 Link(R_1 \ldots R_{K-1}, R_K)}$, --

Column 12, Lines 32-33 at Claim 10; replace:

"$I(R_K|\text{NOT}(R_1 \ldots R_{K-1})) = \alpha e^{-\beta_0 - \beta_1 \delta(R_K) - \beta_2 S(R_1 \ldots R_1 \ldots R^{K-1}, R_K) - \beta_3 Link(R_1 \ldots R_{K-1}, R_K) - \beta_4 Vector(R_1 \ldots R_{K-1}, R_K)}$,"

with
--
$I(R_K|\text{NOT}(R_1 \ldots R_{K-1})) = \alpha e^{-\beta_0 - \beta_1 \delta(R_K) - \beta_2 S(R_1 \ldots R_{K-1}, R_K) - \beta_3 Link(R_1 \ldots R_{K-1}, R_K) - \beta_4 Vector(R_1 \ldots R_{K-1}, R_K)}$, --

Signed and Sealed this
Twenty-third Day of July, 2013

Teresa Stanek Rea
*Acting Director of the United States Patent and Trademark Office*

CERTIFICATE OF CORRECTION (continued)

Column 13, Lines 42-43 at Claim 20; replace:

"$I(R_K|\text{NOT}(R_1 \ldots R_{K-1})) = \alpha e^{-\beta_0 - \beta_1 \delta(R_K) - \beta_2 S(R_1 \ldots R^{K-1}, R_K)},$"

with

-- $I(R_K|\text{NOT}(R_1 \ldots R_{K-1})) = \alpha e^{-\beta_0 - \beta_1 \delta(R_K) - \beta_2 S(R_1 \ldots R_{K-1}, R_K)},$ --

Column 13, Lines 53-54 at Claim 21; replace:

"$I(R_K|\text{NOT}(R_1 \ldots R_{K-1})) = \alpha e^{-\beta_0 - \beta_1 \delta(R_K) - \beta_2 S(R_1 \ldots R_1 \ldots R^{K-1}, R_K) - \beta_3 \text{Link}(R_1 \ldots R_{K-1}, R_K)},$"

with

-- $I(R_K|\text{NOT}(R_1 \ldots R_{K-1})) = \alpha e^{-\beta_0 - \beta_1 \delta(R_K) - \beta_2 S(R_1 \ldots R_{K-1}, R_K) - \beta_3 \text{Link}(R_1 \ldots R_{K-1}, R_K)},$ --

Column 13, Lines 66-67 at Claim 22; replace:

"$I(R_K|\text{NOT}(R_1 \ldots R_{K-1})) =$
$\alpha e^{-\beta_0 - \beta_1 \delta(R_K) - \beta_2 S(R_1 \ldots R_1 \ldots R^{K-1}, R_K) - \beta_3 \text{Link}(R_1 \ldots R_{K-1}, R_K) - \beta_4 \text{Vector}(R_1 \ldots R_{K-1}, R_K)},$"

with

--
$I(R_K|\text{NOT}(R_1 \ldots R_{K-1})) =$
$\alpha e^{-\beta_0 - \beta_1 \delta(R_K) - \beta_2 S(R_1 \ldots R_{K-1}, R_K) - \beta_3 \text{Link}(R_1 \ldots R_{K-1}, R_K) - \beta_4 \text{Vector}(R_1 \ldots R_{K-1}, R_K)},$ --

Column 15, Lines 15-16 at Claim 32; replace:

"$I(R_K|\text{NOT}(R_1 \ldots R_{K-1})) = \alpha e^{-\beta_0 - \beta_1 \delta(R_K) - \beta_2 S(R_1 \ldots R^{K-1}, R_K)},$"

with

-- $I(R_K|\text{NOT}(R_1 \ldots R_{K-1})) = \alpha e^{-\beta_0 - \beta_1 \delta(R_K) - \beta_2 S(R_1 \ldots R_{K-1}, R_K)},$ --

Column 15, Lines 25-26 at Claim 33; replace:

"$I(R_K|\text{NOT}(R_1 \ldots R_{K-1})) = \alpha e^{-\beta_0 - \beta_1 \delta(R_K) - \beta_2 S(R_1 \ldots R_1 \ldots R^{K-1}, R_K) - \beta_3 \text{Link}(R_1 \ldots R_{K-1}, R_K)},$"

with

-- $I(R_K|\text{NOT}(R_1 \ldots R_{K-1})) = \alpha e^{-\beta_0 - \beta_1 \delta(R_K) - \beta_2 S(R_1 \ldots R_{K-1}, R_K) - \beta_3 \text{Link}(R_1 \ldots R_{K-1}, R_K)},$ --

CERTIFICATE OF CORRECTION (continued)
U.S. Pat. No. 8,374,985 B1

Column 16, Lines 10-11 at Claim 34; replace:

"$I(R_K|\text{NOT}(R_1 ... R_{K-1})) = \alpha e^{-\beta_0 - \beta_1 \delta(R_K) - \beta_2 S(R_1...R_1...R^{K-1, R_K}) - \beta_3 Link(R_1...R_{K-1}, R_K) - \beta_4 Vector(R_1...R_{K-1}, R_K)},$"

with

--
$I(R_K|\text{NOT}(R_1 ... R_{K-1})) = \alpha e^{-\beta_0 - \beta_1 \delta(R_K) - \beta_2 S(R_1...R_{K-1}, R_K) - \beta_3 Link(R_1...R_{K-1}, R_K) - \beta_4 Vector(R_1...R_{K-1}, R_K)}$ --